April 28, 1942.  W. I. JONES  2,281,443
ROTARY OPERATED FASTENER INSTALLATION WITH ROTARY OPERATED FASTENER
Filed Dec. 26, 1940
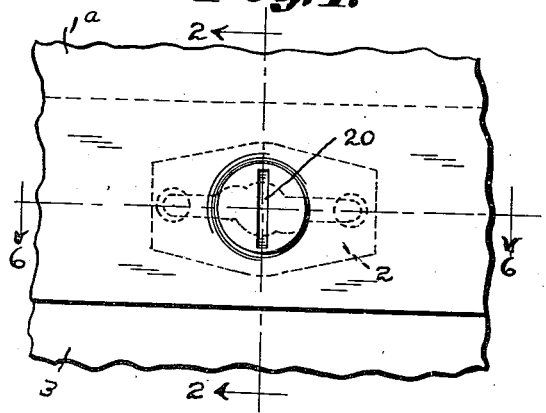
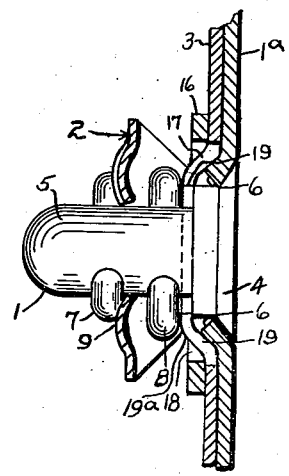
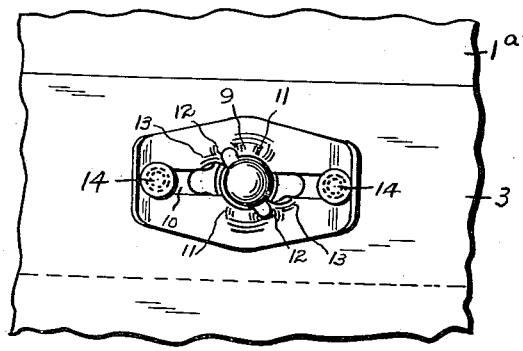
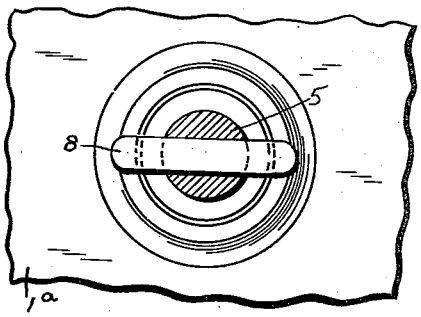
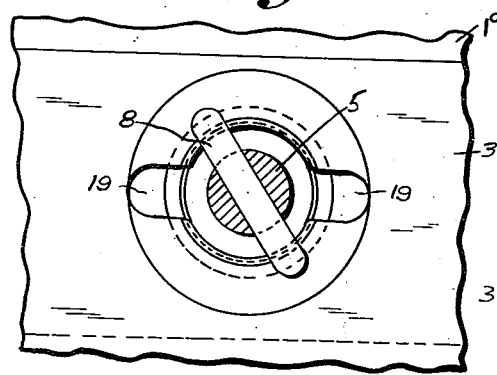
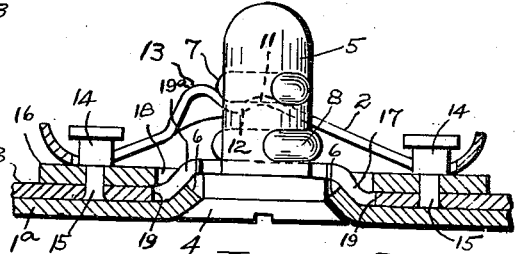
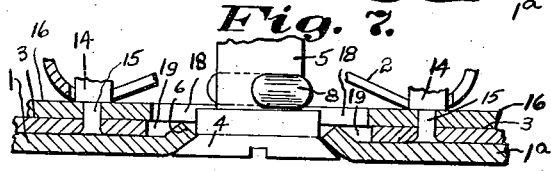
Inventor:
Walter I. Jones Patented Apr. 28, 1942

2,281,443

UNITED STATES PATENT OFFICE 2,281,443

ROTARY OPERATED FASTENER INSTALLATION WITH ROTARY OPERATED FASTENER

Walter I. Jones, Belmont, Mass., assignor to United-Carr Fastener Corporation, Cambridge, Mass., a corporation of Massachusetts Application December 26, 1940, Serial No. 371,638

12 Claims. (Cl. 24—221)

My invention aims to provide improvements in fasteners for securing together two or more members, preferably plate-like, the fasteners being of the so-called rotary operative type and being adapted to lock the plate-like members against any appreciable movement away from each other.

In the drawing which illustrates preferred embodiments of my invention:

Fig. 1 is a front elevational view of an installation showing a portion of a seam secured by my improved fastening means;

Fig. 2 is an enlarged section taken on the line 2—2 of Fig. 1, the fastener stud being shown in side elevation;

Fig. 3 is a rear view of the installation shown in Fig. 1;

Fig. 4 is an enlarged rear view of the rotary member and a portion of the plate to which it is attached, the rotary member being shown in section through the positive locking pin;

Fig. 5 is a view of the parts shown in Fig. 4 with the other member to be fastened in position and the rotary member turned to locking position;

Fig. 6 is an enlarged section taken on the line 6—6 of Fig. 1; and

Fig. 7 is a section similar to that shown in Fig. 6 with a slightly modified arrangement of the assembly and parts being broken away.

My invention relates particularly to an improved fastener of what is known, in the aeroplane industry at least, as a cowl fastener and it operates by rotation of one member of the fastener. My fastener may be used in connection with securing together various parts of aeroplanes, or other members, and it may also be used in connection with any installation where it is desired to use a strong, durable fastener which may be engaged or disengaged by rotation of one of the parts of the fastener. Furthermore, my invention is an improvement on the general type of fastener shown in my application Serial No. 239,826, filed November 10, 1938. The important improvement is in the means which I have provided for locking the apertured members against movement away from each other.

It has been found from experience that the present available types of fasteners, used on aeroplanes, will yield to such an extent, under high speed flying, that the joint opens up and allows a dangerous flow of air through the seam. This is because the spring members of the fasteners can yield a substantial amount thereby permitting the members of the joint to move away from each other. I have overcome this trouble by making a fastener with a special means for cooperating with the parts to lock them against any appreciable movement while the fastener is in locked position.

The particular fastener illustrated by the drawing includes a rotating part 1 assembled with an apertured front member 1a and a sheet metal spring 2 attached to an apertured back plate 3, as illustrated in Figs. 1 and 6.

The rotating member 1 is preferably formed from solid stock for strength and has a head 4 of any desired shape for cooperation with the front member 1a in bearing engagement therewith. The rotating member also has a shank portion 5 which extends through the aperture 6 in the front member 1a and carries a pair of crosspins 7 and 8 the purposes of which will be more fully hereinafter described.

The spring member 2, which is preferably formed from heat-treated metal to provide toughness and springiness, is of elongated construction (Fig. 3) and has a central embossed portion 9 divided by a slot 10 which extends substantially to opposite ends of the spring. The embossed portion is so shaped that it provides opposed cam-shaped portions 11—11 and opposed detent portions 12—12, as shown in Figs. 3 and 6. It also has opposed stop portions 13—13 adjacent to the detents 12—12. The opposite ends of the spring are curled upwardly so that they will not bite into the metal of the part supporting the spring. This spring member is assembled with the apertured back plate 3 by means of a pair of rivets 14—14 passing through the slot 10 adjacent to its ends and these rivets are provided with special head portions which will hold the spring in place while permitting a certain amount of float of the spring. The riveting portions 15—15 of the rivets pass through the plate 3 and are upset on that side which faces the front member 1a, as shown in Fig. 6. Between the spring 2 and the back plate 3 I have provided a spacing plate 16 which may serve two purposes, as shown in Figs. 6 and 7. In Fig. 6 the plate 16 acts as a spacing means so that the spring 2 may be spaced far enough away from the back plate 3 to permit proper operation of the pins 7 and 8, as will be hereinafter described. In Fig. 7 the plate 16 not only acts as a spacing means but also acts as a wear plate against which the pin 8 may engage during rotation of the rotary part and also while the fastener is in locked position. The desirability of the spacing plate 16 being also used as a wear plate will be understood when the fastener is used in connection with securing together front and back plates that are made of light-weight, relatively soft material. In that case it is desirable that the spacing plate 16 should be made of some sort of tough wear-resisting material such as steel.

To assemble the plates 1a and 3 by means of my improved fastener it is only necessary to bring the plates into a superposed position where the aperture 6 in the plate 1a is in substantial alignment with the aperture 17 in the plate 3. During this operation of bringing the parts together the shank 5 of the rotating member will pass through the aperture 17 and also through the aperture 18 in the spacing plate 16 and the end will enter the central portion of the slot 10 in the spring 2. If the pins 7 and 8 carried by the rotating member are in alignment with the extensions 19—19 (Fig. 5) of the aperture 17 they will pass through without any difficulty, but if they are not in alignment a rotation of the rotating member 1 by insertion of a suitable rotating tool in the slot 20 will bring them into alignment and as they pass through the pin 7 will also pass through the slot 10 in the spring. Continued rotation of the fastener in a clockwise direction will cause the pin 7 to engage the cam portions 11—11 of the spring 2 and the spring will thus be compressed until the pin 7 reaches the detents 12—12 and the stops 13—13 where the fastener is in locked position and is held against accidental unlocking by the tension of the spring against the crosspin 7. During this rotating movement to bring the fastener parts into locking engagement the pin 8 has also rotated with the shank 5 into a position substantially as shown in Fig. 5. The ends of this pin are bearing against the embossed portion 19a of the back plate 3, as illustrated in Fig. 6, or against the wear plate 16, as shown in Fig. 7. Thus the plate members of the installation are held between the head 4 of the rotating member and the crosspin 8 against any substantial movement away from each other. Thus I have provided a positive lock against the opening up of any seam which may be held together by my improved fasteners and any strong pressures tending to separate the plates 1a and 3 are effectively resisted by this clamping action between the head 4 and the pin 8.

The pin 8 also acts as a means for holding the stud in assembly with the front plate 1a since its length is such as to span the hole 6 and not permit the stud to fall out, as best illustrated in Fig. 4. Thus in assembly of the stud with the front plate the pin 8 is inserted by means of any suitable tool after the shank of the stud has been entered through the aperture 6 in the plate member 1a.

It is believed that anyone skilled in the art will readily see that I have provided a fastener which in general is similar to the one illustrated and described in my application referred to above. In addition to that, however, I have provided a locking means which solves a problem which apparently has not been solved heretofore, especially for aircraft manufacturers, while at the same time providing for ready engagement and disengagement of parts by a fastening means other than a bolt or a rivet. My improved fastener while solving a very important problem is simple as well as efficient and it can be used in connection with various thicknesses of materials to be joined either by predetermined location of the pins, especially the relation of the pin with the head 4, or by varying the thickness of the wear plate 16.

While I have illustrated and described preferred embodiments of my invention, I do not wish to be limited thereby, because the scope of my invention is best defined by the following claims.

I claim:

1. In a fastener installation of the class described, a plurality of apertured members to be fastened together, a stud member passing through the said members, a part for engagement with the stud, interengaging elements provided by the stud and part to hold the assembly in fastened engagement and positive locking means provided as a part of the installation to prevent any appreciable movement of the apertured members in directions away from each other while the said stud and part are in fastened position.

2. In a fastener installation of the class described, a plurality of apertured members to be fastened together, a stud member passing through the said members, a spring part for engagement with the stud, interengaging elements provided by the stud and spring part to hold the assembly in fastened engagement and positive locking means provided as a part of the installation to prevent any appreciable movement of the apertured members in directions away from each other while the said stud and part are in fastened position.

3. In a fastener installation of the class described, a plurality of apertured members to be fastened together, a stud member passing through the said members, a spring part for engagement with the stud, interengaging elements provided by the stud and spring part to hold the assembly in fastened engagement and positive locking means carried by the stud and acting as a lock to prevent any appreciable movement of the apertured members away from each other.

4. In a fastener installation of the class described, a plurality of apertured members to be fastened together, a rotary operative stud having a head bearing against the outer surface of one apertured member and a shank extending through all of the apertured members, a lateral projection carried by the stud and overlying the inner surface of the inner apertured member when the stud is turned to fastening position thereby to hold all of the apertured members in close face-to-face engagement and stud-holding means located at the inner face of the installation to engage and hold the stud in fastening position while permitting release by positive rotation of the said stud.

5. In a fastener installation of the class described, a plurality of apertured members to be fastened together, a rotary operative stud having a head bearing against the outer surface of one apertured member and a shank extending through all of the apertured members, a lateral projection carried by the stud and overlying the inner surface of the inner apertured member when the stud is turned to fastening position thereby to hold all of the apertured members in close face-to-face engagement and stud-holding spring means located at the inner face of the installation to engage and hold the stud in fastening position while permitting release by positive rotation of the said stud.

6. In a fastener installation of the class described, a plurality of apertured members to be fastened together, a rotary operative stud having a head bearing against the outer surface of one apertured member and a shank extending through all of the apertured members, a lateral projection carried by the stud and overlying the inner surface of the inner apertured member when the stud is turned to fastening position thereby to hold all of the apertured members in close face-to-face engagement and stud-holding means located at the inner face of the installation to engage and hold the stud in fastening position while permitting release by positive rotation of the said stud, and said lateral projection being in the form of a removable crosspin which also acts as a stud-retaining means holding the stud in assembly with its apertured member.

7. In a fastener installation of the class described, a plurality of apertured members to be fastened together, a rotary operative stud having a head bearing against the outer surface of one apertured member and a shank extending through all of the apertured members, a pair of spaced crosspins assembled with said shank, one of said pins being spaced from the head a distance approximately the thickness of the apertured members so that said members will be held together between said head and said crosspin when the stud is rotated to fastening position, a bowed spring member attached to the inner surface of the inner apertured member and having cam means cooperating with the other crosspin to hold the parts in fastened relation.

8. In a rotary fastener for use in an installation of the class described, a stud member having a head provided with means by which the stud may be rotated, a pair of spaced crosspins assembled with said stud member, one being spaced from the head and adapted to cooperate with the head to lock the parts of the installation against substantial separating movement, and a second part of the fastener having means for cooperation with the other crosspin to hold the stud in installation-locking position.

9. In a rotary fastener for use in an installation of the class described, a stud member having a head provided with means by which the stud may be rotated, a pair of spaced crosspins assembled with said stud member, one being spaced from the head and adapted to cooperate with the head to lock the parts of the installation against substantial separating movement, and a second part of the fastener having means for cooperation with the other crosspin to hold the stud in installation-locking position, said locking crosspin being readily attachable and removable for the purposes described.

10. In a fastener installation of the class described, a plurality of apertured members to be fastened together, a stud member passing through the said members, a part for engagement with the stud, interengaging elements provided by the stud and part to hold the assembly in fastened engagement, positive locking means provided as a part of the installation to prevent any appreciable movement of the apertured members in directions away from each other while the said stud and part are in fastened position and a plate-like member interposed between the part for engagement with the stud member and the inner face of one of the apertured members for cooperation with the positive locking means to reenforce the said installation.

11. In a fastener installation of the class described, a plurality of apertured members to be fastened together, a stud member passing through the said members, a part for engagement with the stud, interengaging elements provided by the stud and part to hold the assembly in fastened engagement, positive locking means provided as a part of the installation to prevent any appreciable movement of the apertured members in directions away from each other while the said stud and part are in fastened position and a plate-like member interposed between the part for engagement with the stud member and the inner face of one of the apertured members for cooperation with the positive locking means to reenforce the said installation, said positive locking means being in the form of a crosspin assembled with the stud.

12. In a fastener installation of the class described, a plurality of apertured members to be fastened together, a stud member passing through the said members, a part for engagement with the stud, interengaging elements provided by the stud and part to hold the assembly in fastened engagement and a crosspin assembled with the stud between the interengaging elements and the apertured members to limit the amount of relative movement of said apertured members toward and away from each other.

WALTER I. JONES.